US 7,895,657 B2

(12) United States Patent
Bennett

(10) Patent No.: US 7,895,657 B2
(45) Date of Patent: Feb. 22, 2011

(54) SWITCHING NETWORK EMPLOYING VIRUS DETECTION

(75) Inventor: James D. Bennett, San Clemente, CA (US)

(73) Assignee: Broadcom Corporation, Irvine, CA (US)

( * ) Notice: Subject to any disclaimer, the term of this patent is extended or adjusted under 35 U.S.C. 154(b) by 1019 days.

(21) Appl. No.: 11/491,052

(22) Filed: Jul. 20, 2006

(65) Prior Publication Data

US 2008/0019352 A1 Jan. 24, 2008

Related U.S. Application Data

(63) Continuation-in-part of application No. 11/429,477, filed on May 5, 2006, and a continuation-in-part of application No. 11/429,478, filed on May 5, 2006, and a continuation-in-part of application No. 11/474,033, filed on Jun. 23, 2006.

(51) Int. Cl.
*G06F 21/00* (2006.01)
(52) U.S. Cl. .............................. 726/24; 726/22; 726/23
(58) Field of Classification Search .............. 726/22–24
See application file for complete search history.

(56) References Cited

U.S. PATENT DOCUMENTS

| | | | |
|---|---|---|---|
| 6,195,698 B1 | 2/2001 | Lillibridge | |
| 6,393,568 B1 | 5/2002 | Ranger | |
| 6,678,272 B1 | 1/2004 | Tzeng | |
| 2002/0007453 A1 | 1/2002 | Nemovicher | |
| 2002/0032880 A1 | 3/2002 | Poletto et al. | |
| 2002/0069370 A1 | 6/2002 | Mack | |
| 2002/0087885 A1 | 7/2002 | Peled | |
| 2002/0129140 A1 | 9/2002 | Peled | |

(Continued)

FOREIGN PATENT DOCUMENTS

EP    1063833 A    12/2000

(Continued)

OTHER PUBLICATIONS

Gentoo Linux, "Firewalls" http://www.gentoo.org/doc/en/security/security-handbook.xml?part=1&chap=12 Internet Archive Wayback Machine used. Apr. 2006, pp. 1-13.*

(Continued)

*Primary Examiner*—Nasser Moazzami
*Assistant Examiner*—Lisa Lewis
(74) *Attorney, Agent, or Firm*—Garlick Harrison & Markison; Bruce E. Garlick

(57) ABSTRACT

In a digital communication infrastructure, intermediate network nodes compare packets from end-point devices with pluralities of virus templates. Upon detecting matches, virus service functions are invoked which interrupt the packet flow. Network wide template and service functionality updating is provided to service pluralities of virus service software vendors. Non-repetitive detection processing minimizes network load. Virus service functions may execute locally and/or remotely. Servicing may include dropping packets containing virus codes or, processing and routing the packets. Pop-up messages revealing underlying template matches are delivered with human challenge mechanism. The network nodes may be routers, packet switching exchanges, switches, access points, Internet service provider equipment, etc. External vendor servers and server clusters may assist network nodes in detecting and processing packets for virus codes.

27 Claims, 13 Drawing Sheets

U.S. PATENT DOCUMENTS

| | | |
|---|---|---|
| 2002/0129237 A1 | 9/2002 | Radatti |
| 2003/0041259 A1* | 2/2003 | Vignoles et al. ............ 713/200 |
| 2003/0172262 A1 | 9/2003 | Curry |
| 2005/0050338 A1 | 3/2005 | Liang |
| 2005/0050362 A1 | 3/2005 | Peles |
| 2005/0210533 A1 | 9/2005 | Copeland |
| 2005/0232262 A1 | 10/2005 | Toumura |
| 2005/0238005 A1 | 10/2005 | Chen et al. |
| 2005/0251486 A1 | 11/2005 | Nair |
| 2005/0278784 A1 | 12/2005 | Gupta |
| 2006/0072582 A1 | 4/2006 | Bronnimann |
| 2006/0075494 A1 | 4/2006 | Bertman |
| 2006/0085528 A1 | 4/2006 | Thomas |
| 2006/0095971 A1 | 5/2006 | Costea |
| 2006/0174345 A1 | 8/2006 | Flanagan |
| 2006/0248575 A1 | 11/2006 | Levow |

FOREIGN PATENT DOCUMENTS

| | | |
|---|---|---|
| EP | 1335559 A | 8/2003 |
| EP | 1560398 A2 | 1/2005 |
| EP | 1699204 A | 9/2006 |
| KR | 2004 0102907 A1 | 12/2004 |
| WO | WO 97/12321 A | 4/1997 |
| WO | WO 0219639 A | 3/2002 |
| WO | WO 2004/091158 A | 10/2004 |
| WO | WO 2005/017708 A | 2/2005 |
| WO | WO 2005/064498 * | 7/2005 |

OTHER PUBLICATIONS

GFi "Why One Virus Engine is Not Enough" white paper. http://www.gfi.com/whitepapers/why-one-virus-engine-is-not-enough.pdf Internet Archive Wayback Machine Used. Jul. 2004. pp. 1-4.*

Yoo, "Adaptive Firewall Model to Detect Email Viruses", Security Technology 2004 38th Annual 2004 International Carnahan Congerence, Oct. 2004, pp. 1-2.*

Maya Gokhale et al; "Granidt: Towards Gigabit Rate network Intrusion Detection Technology"; FPL 2002, Montpellier,France.

Dharmapurikar S. et al; "Deep Packet Inspection Using Parallel Bloom Filters"; IEEE Micro, IEEE Service Center Los Alamitos, CA,US Jan. 2004.

Steve White, et al; "Anatomy of a Commercial-Grade Immune System"; Internet Citation, Jun. 1999 (XP-002310183).

Young H. Cho, et al; "A Pattern Matching Co-processor for Network Security"; DAC 05; Proceedings of the 42nd Annual Conf. on Design Automation Jun. 13, 2005.

Shanmugasundaram Kulesh et al; "Payload Attribution via Hierarchical Bloom Filters"; Proc ACM Conf Computer Commun Secur; Proceedings of the ACM Conf on Computer & Comm. 2004 (XP002453251).

Cisco; "Committed Access Rate"; Internet Citation 1999 (XP-002375164).

Cisco ISP Essentials; Internet Citation Jun. 6, 2001 (XP-002217477).

David Whyte, et al; "DNS-Based Detection of Scanning Worms in an Enterprise Network";Security Symposium, Feb. 4, 2005 (XP-002412148).

* cited by examiner

SWITCHING NETWORK EMPLOYING VIRUS DETECTION

CROSS REFERENCE TO RELATED APPLICATIONS

The present application makes is a continuation-in-part of U.S. patent application entitled "PACKET ROUTING WITH PAYLOAD ANALYSIS, ENCAPSULATION AND SERVICE MODULE VECTORING", filed May 5, 2006, and having Utility patent application Ser. No. 11/429,477, the complete subject matter of which is hereby incorporated herein by reference in its entirety.

The present application is a continuation-in-part of U.S. patent application entitled "PACKET ROUTING AND VECTORING BASED ON PAYLOAD COMPARISON WITH SPATIALLY RELATED TEMPLATES", filed May 5, 2006, and having Utility patent application Ser. No. 11/429,478, the complete subject matter of which is hereby incorporated herein by reference in its entirety.

The present application is a continuation-in-part of U.S. patent application entitled "INTERMEDIATE NETWORK NODE SUPPORTING PACKET ANALYSIS OF ENCRYPTED PAYLOAD", filed Jun. 23, 2006, and having Utility patent application Ser. No. 11/474,033, the complete subject matter of which is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

1. Field of the Invention

This invention generally relates to communication infrastructures, and, more particularly, to switching node operations in a packet switched communication network.

2. Related Art

Internet networks today transport audio, video, as well as data packets, which may include packets from encrypted files or encrypted packets, between end-point devices. An Internet infrastructure typically includes network nodes such as routers, switches, packet switched exchanges, access points and Internet service provider's networks (ISPN), Internet communication pathways and end-point devices. The end-point devices include personal or laptop computers, servers, set top boxes, handheld data/communication devices and other client devices, for example. Internet communication via nodes in the Internet network is riddled with unrestrained trafficking of packet payloads, which may contain disruptive, unauthorized, unwanted, and unsuitable content. Disruptive contents include packets containing virus codes that disrupt functions of the end-point devices.

However, often, end-point devices are typically incapable of eliminating such packets or packet flow. To attempt to do so, users of end-point devices install virus detection, quarantining, and/or removal software packages (hereinafter "virus processing packages"). Users often purchase multiple virus processing packages as current packages often fail to address the ever-increasing list of viruses. Although sometimes free, most are expensive especially considering the multiple package burdens.

Virus processing are becoming more complex to address the ever-increasing complexity of virus threats. To perform their services, such packages typically slow down or interrupt other user and end-point device operations. Such slow downs and interrupts are compounded by the need to update and renew subscriptions for the underlying virus processing packages.

Despite user efforts, end-point devices often receive virus infections. These may be due to new viruses or viruses not addressed by underlying virus processing package installations. Moreover, users often forget to update or renew their subscriptions to installed virus processing packages leading to further infections. Viruses have proven to be very successful in spreading even when the majority of users diligently use and update virus-processing packages. Typical virus processing packages perform their services some time after becoming infected. Thus, by either forgetting to update or renew or only periodically attempting detection, virus-processing packages allow viruses to take over operations of an end-point device. Once taken over, typical viruses immediately attempt to infect other end-point devices located within a local network and throughout the Internet.

Viruses enter an end-point device through various mechanisms. They are often hidden within removable media and infect one after another end-point device as such removable media is exchanged between end-point devices. Other entry mechanisms involve communication links. For example, many viruses find entry via the Internet. End-point devices exchange virus code for execution by or download via web browser and email applications. Some email service providers screen email attachments for such viruses and attempt to block virus delivery. Some web browsers have built in services that pause operations and warn that a pending download or executable code is a vehicle for virus infection and permit the user to abort such action.

Further limitations and disadvantages of conventional and traditional approaches will become apparent to one of ordinary skill in the art through comparison of such systems with the present invention.

BRIEF SUMMARY OF THE INVENTION

The present invention is directed to apparatus and methods of operation that are further described in the following Brief Description of the Drawings, the Detailed Description of the Invention, and the Claims.

In accordance with the present invention, a digital communication infrastructure that communicates a plurality of packets, each of which having payload content, from a first end-point device to a second end-point device, consisting a communication pathway, plurality of service functions, plurality of predefined virus templates and a processing circuitry. The communication pathway communicates the plurality of packets from the first end-point device to the second end-point device. The processing circuitry both delivers the plurality of packets along at least a portion of the communication pathway and non-repetitively compares the predefined virus templates with each of the plurality of packets in the communication pathway and based at least in part on the comparison, selects one of the plurality of service functions.

In accordance with the present invention, a Packet Switching Exchange (PSE) in an Internet infrastructure that participates in a communication pathway that supports delivery of a packet from a source end-point device toward a destination end-point device. The PSE consists of a plurality of switches, a plurality of line cards that includes a first line card and a primary processing circuitry communicatively coupled to the plurality of switches. The first line card is communicatively coupled to the plurality of switches, comprising a first network interface and first secondary processing circuitry. The first line card verifies if payload analysis is indicated for the packet. Further, the first line card compares payload content of the packet to a plurality of predefined virus templates if payload analysis is indicated and, in response to the comparison of payload content of the packet, the first line card delivers the packet and supplemental information to the primary processing circuitry. The primary processing circuitry responds to the delivery by comparing a predefined supplemental virus template against the packet and, based on the comparison, delivers the packet to a first of a plurality of service modules for processing.

A network node in an Internet infrastructure that receives a first of plurality of packets from a source end-point device, destined to a destination end-point device, consisting interface circuitry that receives the plurality of packets, storage, and processing circuitry, communicatively coupled to the interface circuitry. The processing circuitry verifies if payload analysis is indicated and compares the first of plurality of packets with at least one virus template, if payload analysis is indicated. Then, the processing circuitry applies service modules to the packet, in response to the comparison.

Features and advantages of the present invention will become apparent from the following detailed description of the invention made with reference to the accompanying drawings.

DETAILED DESCRIPTION OF THE INVENTION

Figure 1A:
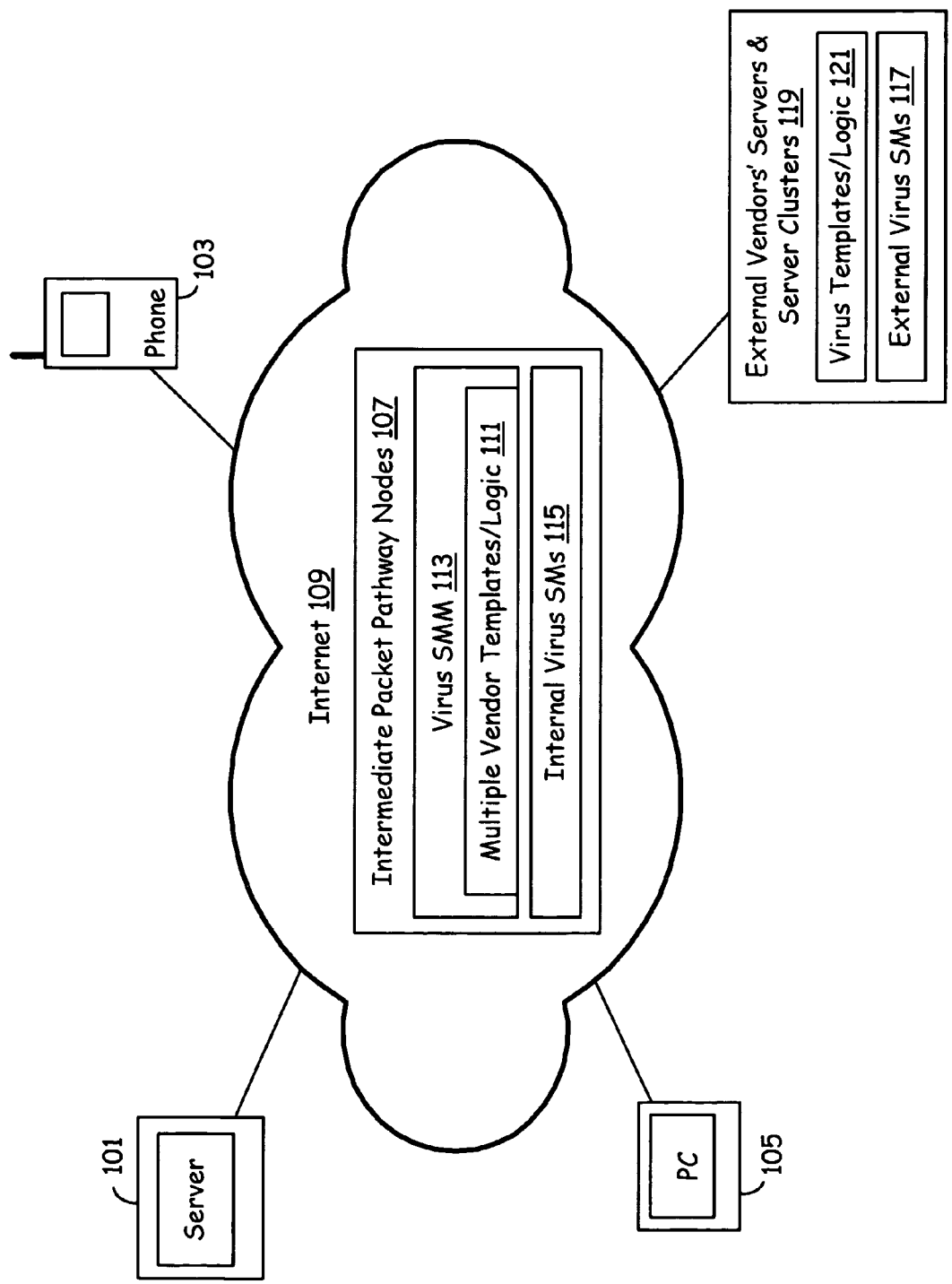
FIG. 1a is a schematic block diagram illustrating an embodiment of a virus processing infrastructure built in accordance with the present invention, wherein switching nodes detect and trigger processing of packets that contain virus codes.

FIG. 1a is a schematic block diagram illustrating an embodiment of a virus-processing infrastructure built in accordance with the present invention, wherein switching nodes detect and trigger processing of packets that contain virus codes. Within the virus-processing infrastructure, a plurality of end-point devices, such as a server 101, phone 103, and computer 105, is protected from virus infections by equipment within the packet routing infrastructure.

When the end-point devices attempt to exchange packets, a variety of intermediate packet pathway nodes 107 in Internet 109 receive and forward packets from the source toward the destination. Upon receiving a packet, the intermediate packet pathway nodes 109 screen the packet for viruses. Screening involves comparison of a packet field and/or packet payload against multiple vendors' virus templates and associated logic 111. A virus service module manager 113 performs such comparison. If a virus or likelihood of a virus is detected (hereinafter if the packet has a "virus characteristic"), the virus service module manager 113 delivers the packet to at least one of internal and external virus service modules 115 and 117, respectively. For example, a virus characteristic might comprise one or more payload byte sequences the existence of which in a packet indicates that at least a portion of a certain virus exists within the packet payload. A virus characteristic might also include source address match with that of a known end-point device that repeatedly attempts to spread a virus. Similarly, virus characteristics may include file name text sequences or other payload or supplemental packet field matches that at least suggest that a virus may be present.

The virus service modules 115 and 117 may perform further processing to confirm the existence of a virus. Whether or not such further processing is performed, the virus service modules 115 and 117 apply specific functionality targeting the associated virus. For example, the virus service module 115 or 117 might communicate a warning to one or both of the end-point devices involved in the exchange but continue delivery of the packet. Alternatively, the packet may be discarded with or without the warning. Instead of discarding a packet, the virus service modules 115 and 117 may modify the packet to disable the virus with or without effecting the functionality of the overall communication exchange. The specific operation of a service module is provided by virus software developers with the goal of warning, inhibiting or otherwise preventing the spread of viruses.

Although only a single vendor's locally stored service modules and associated templates and logic may be employed, the virus-processing infrastructure supports pluralities of vendors that each provides pluralities of service modules targeting specific viruses or virus families. These service modules can be stored on the intermediate packet pathway nodes 107 or on external servers and server clusters 119, i.e., the virus service modules 115 and 117. The internal virus service modules 115 and the templates and associated logic 111 may be automatically or manually updated from most recent releases stored on the external servers and clusters 119. For example, the latest from one vendor may be stored within virus templates and logic 121 and made available for copying to the multiple vendor templates and logic 111. The virus service modules 115 may be similarly updated or added.

To prevent duplicative virus processing by other of the intermediate packet pathway nodes 121, each of the intermediate packet pathway nodes 121 add an indication within the packet that the packet has been evaluated. Alternatively, the intermediate packet pathway nodes 121 may cooperate to select one of the nodes 121 in the pathway to perform the analysis.

With the pathway virus protection in place, the various end-point devices may but need not run virus protection software except as may be prudent to protect removable media borne viruses. Because end-point devices and their users are not responsible for updates, the illustrated virus protection infrastructure is more likely to be kept up to date and doing so is much easier.

Figure 1B:
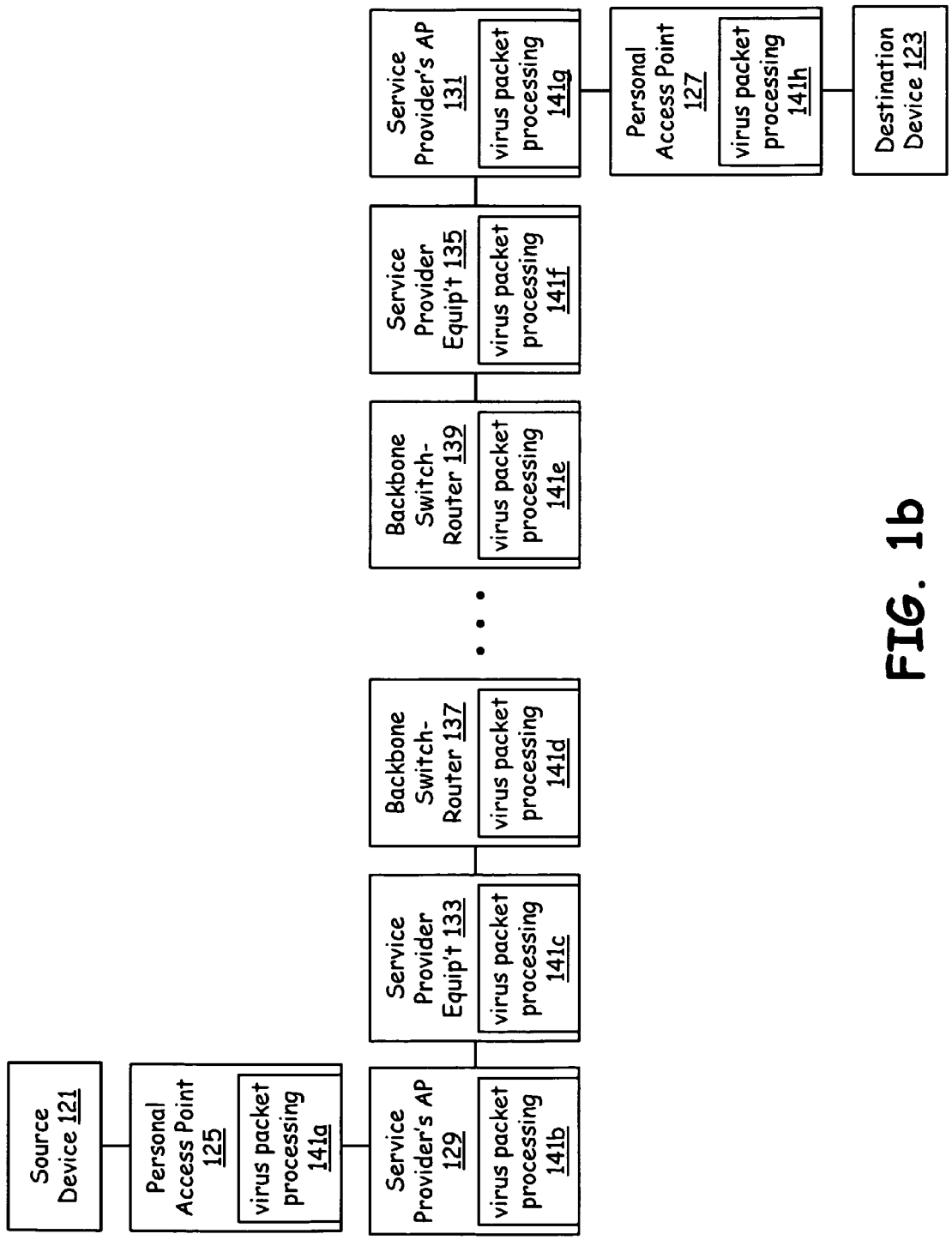
FIG. 1b is a schematic block diagram of an embodiment of the virus processing infrastructure of FIG. 1a, illustrating further detail of the intermediate packet pathway nodes.

FIG. 1b is a schematic block diagram of an embodiment of the virus processing infrastructure of FIG. 1a, illustrating further detail of the intermediate packet pathway nodes 107 (FIG. 1a). In particular, two end-point devices, a source device 121 and a destination device 123, exchange a series of packets via an Internet infrastructure. The source device 121 constructs a packet using, among other information, a data segment, and the Internet address of the destination device 123. The source device 121 then delivers the packet into the Internet infrastructure toward the destination device 123. The Internet infrastructure provides a routing pathway for the packet from the source device 121 to the destination device 123. Within the routing pathway, virus processing such as that mentioned with reference to FIG. 1a is applied to the packet. If the presence of a virus or likelihood of a virus is indicated through analysis of the packet, packet delivery may be interrupted, end-point warnings may be sent, packet content may be changed, and/or other functionality may be invoked as defined by service functionality targeting the particular underlying virus.

The routing pathway between the end-point devices consists of personal access points 125 and 127, service provider's access points 129 and 132, other service provider equipment 133 and 135, and plurality of backbone nodes such as backbone switch-router 137 and 139. The nodes 125 through 139 comprise "intermediate pathway nodes" as used herein. The intermediate pathway nodes may also comprise any equipment involved in the delivery of the packet from the source device 121 to the destination 123. Typically, this includes routers and switches within the backbone of Internet 109, as shown. It also includes, but is not limited to, personal access point devices, service provider equipment (including access point devices, routers, switches, gateways, computing devices, etc.), and backbone equipment (routers, bridges and switches), for example.

As illustrated, each of the intermediate packet nodes 125, 129, 133, 137, 139, 135, 131 and 127 comprise corresponding virus packet processing capabilities 141a-h. Each of the virus packet processing capabilities 141a-h involve the screening of packet content for viruses and support either local or remote processing upon detection. Although each intermediate node in the pathway from the source device 121 to the destination device 123 could apply the virus packet processing, various configurations are employed to prevent duplication of efforts.

For example, in one configuration, the first intermediate node that performs the virus packet processing supplements the packet with a field that indicates that screening has been completed. The actual content of the field being the version of the virus templates employed. Any node along the pathway that has the same or an older version of the virus templates will withhold invoking the virus processing. However, any subsequent intermediate node that identifies an older version of the virus templates in the field will apply the new and revised (i.e., updated) templates since the older version. After applying such updated templates, the subsequent intermediate node replaces the field with the latest template version that it has applied and continues the packet routing. The use of multiple fields or a more complex field to avoid duplicative effort is contemplated.

In another configuration, the intermediate nodes in the pathway may exchange additional packets from one another or from a control center that devices virus packet processing duties via a given port. For example, even though the backbone switch-router 137 is capable of doing so, the backbone switch-router 139 may be assigned to screen all traffic received from the backbone switch-router 137. All traffic sent from the backbone switch-router 139 to the backbone switch-router 137 may become the responsibility of the backbone switch-router 137. Similar arrangements can be negotiated, forced, or otherwise made throughout the network infrastructure.

Although shown, the virus packet processing capabilities may not be included in every intermediate node in the pathway so long as at least one is included, enabled, and operational. For example, only the intermediate packet pathway nodes at the network edges or at the network core may be installed or enabled. Other partial rollout into the network is also contemplated.

Figure 1C:
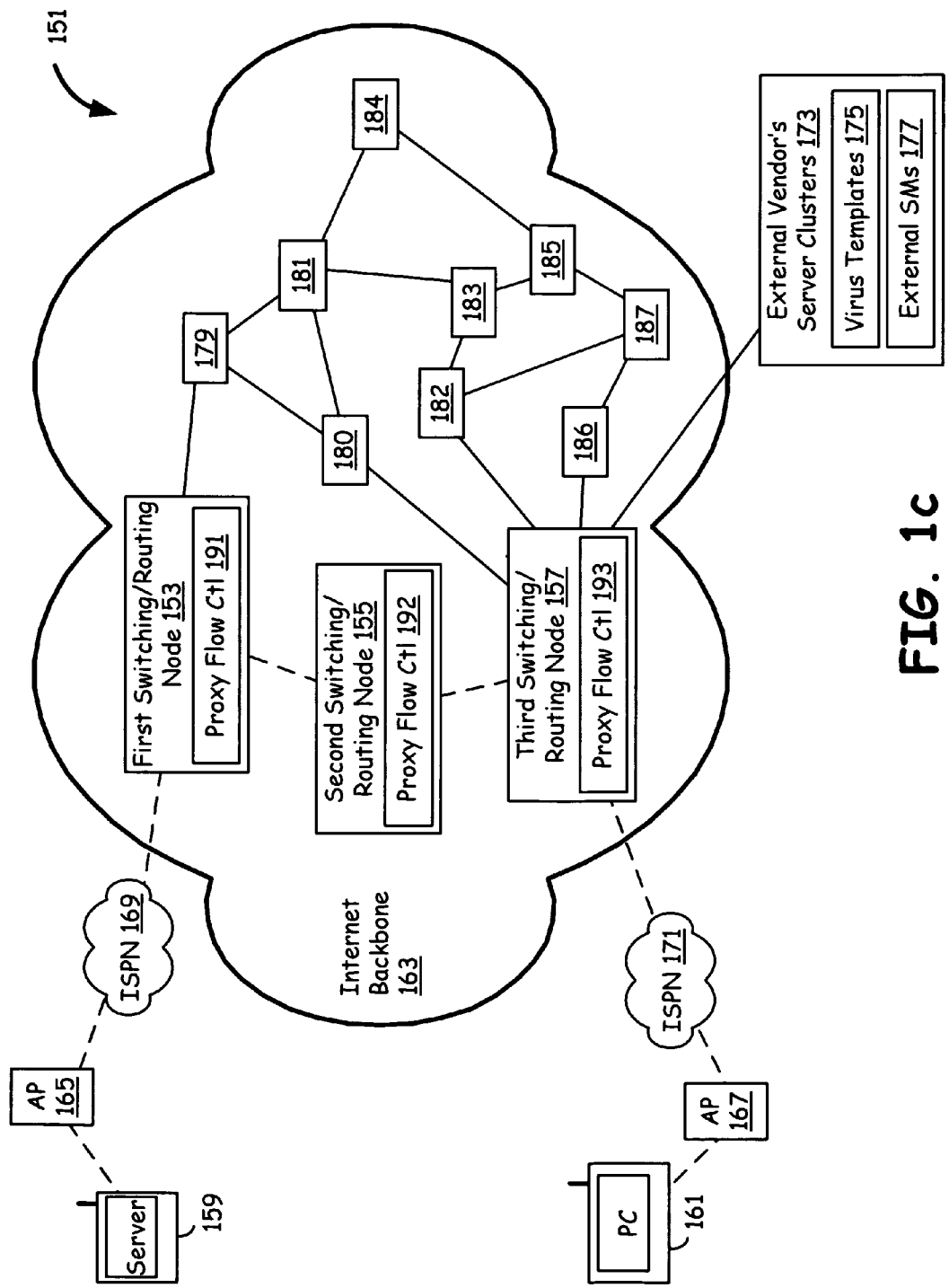
FIG. 1c is a schematic block diagram illustrating another embodiment of virus processing infrastructure of FIG. 1a, wherein intermediate Internet backbone nodes employing proxy functionality detect and process packets with encrypted or encoded virus information.

FIG. 1c is a schematic block diagram illustrating another embodiment of virus processing infrastructure of FIG. 1a, wherein intermediate Internet backbone nodes employing proxy functionality detect and process packets with encrypted or encoded virus information. More particularly, in a virus processing infrastructure 151, intermediate Internet backbone nodes route packets originating from a source end device, such as a server 159, to a destination end device, such as a Personal Computer (PC) 161. As illustrated, one possible communication path containing intermediate Internet backbone nodes, through which packets are routed, is shown with dashed lines, i.e., via switching or routing nodes 153, 155 and 157 in an Internet Backbone 163. Although not directly supporting virus processing in this embodiment, Access Points (AP) 165 and 167 and other equipment within Internet Service Provider Networks (ISPNs) 169 and 171 provide pathways to the Internet backbone 163. In addition to routing, the intermediate nodes 153-157, in cooperation with external vendor's server clusters 173, compare virus templates with packet payloads, detect packets containing virus codes, and service detected packets. Such cooperation may involve: a) comparing the virus templates with the packet within the intermediate nodes and, upon matching, vectoring the packet for internal or external servicing; or b) vectoring copies of packets to the external server or server clusters 173 for comparison with virus templates and, upon matching, vectoring the packet for servicing by the intermediate node or by the external server or server clusters 173.

The Internet backbone 163 contains many more switching nodes, such as nodes 179 through 187, which also perform the above said functionality, regarding packets received. If the intermediate backbone nodes 153-157 or 179-187 encounter encrypted or encoded packets or packets from an encrypted or encoded files, such packets and/or portions of files are decrypted or decoded appropriately and virus detection and processing functionality are thereafter applied. In one embodiment, to accommodate such decryption and decoding, proxy flow control 191, 192, and 193 supports stepwise encryption and encoding by targeting the intermediate node in the process. Instead of using the public key of the destination end-point device, the source end-point device uses the public key of an intermediate backbone node. Upon receipt, the intermediate backbone node uses its private key to decrypt the packet. Once decrypted, the virus screening and processing is applied. If no virus is detected, the intermediate node encrypts the packet (i.e., encrypts the packet payload) using the public key of the destination device and forwards the encrypted packet toward the destination device. Decoding is handled similarly in a stepwise manner.

The proxy flow control 191-193 also supports file-wide encryption and encoding by supporting temporary storage, file reconstruction, and subsequent virus processing. Instead of addressing each of a plurality of packets representing a file to the destination end-point device, the source device addresses the packets to an intermediate backbone node, which assembles them and applies the virus screening thereto. If the file is received without an embedded virus, the intermediate backbone node delivers the packets toward the destination device.

Figure 2:
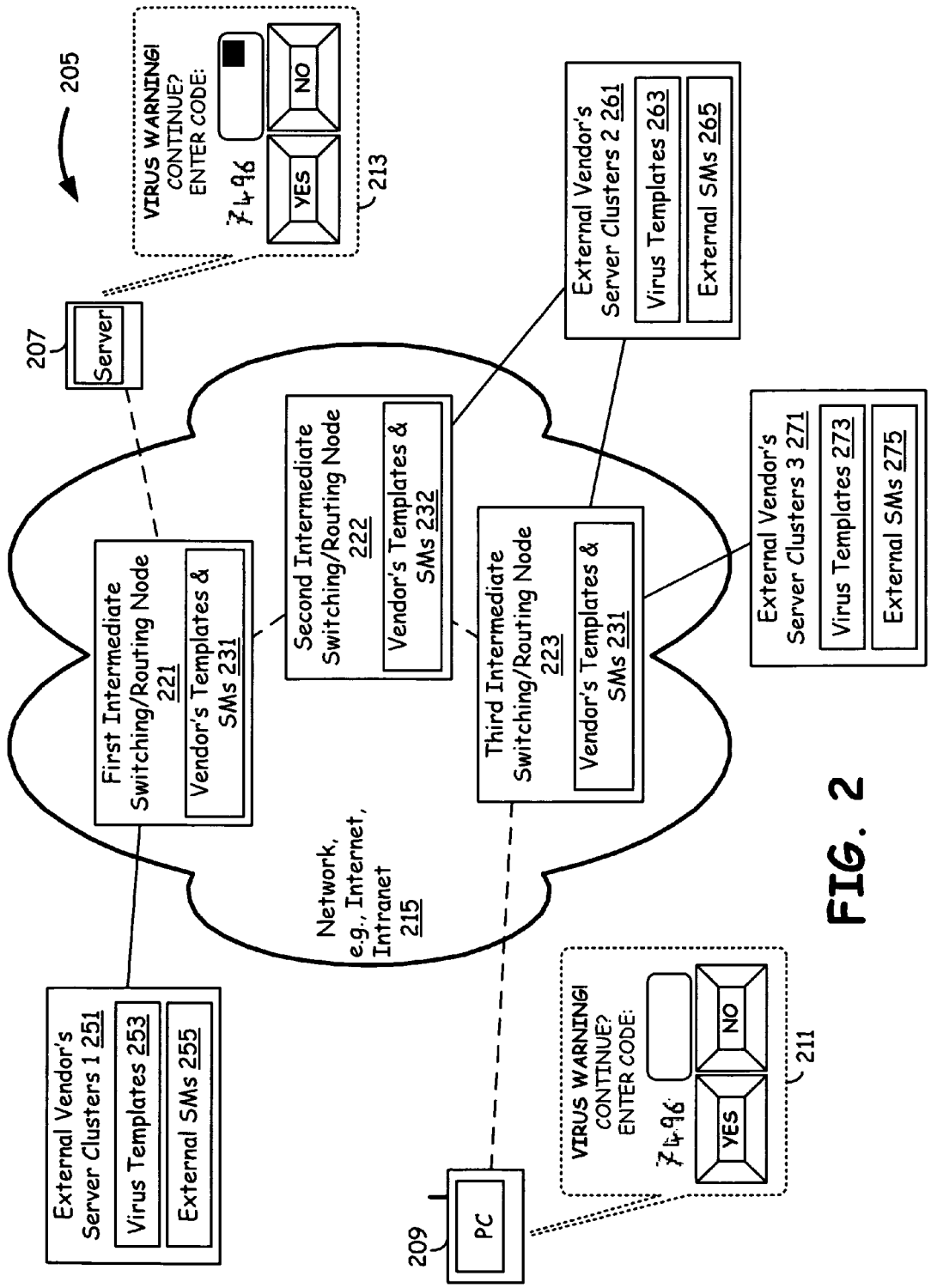
FIG. 2 is another schematic block diagram illustrating a communication infrastructure 205, where network wide upgrade of virus templates and service modules takes place manually or automatically; and one or more of intermediate network nodes, in conjunction with external vendor's server clusters, detect packets with virus contents and non-repetitively process such packets, and send messages to end-point devices.

FIG. 2 is another schematic block diagram illustrating a communication infrastructure 205, where network wide upgrade of virus templates and service modules takes place manually or automatically; and one or more of intermediate network nodes, in conjunction with external vendors' server clusters, detect packets with virus contents and non-repetitively process such packets, and send messages to end-point devices. The intermediate network nodes, such as nodes 221, 222 and 223, in a network 215, may be access points, routers, switches, ISPNs or any other nodes that carry out the functionality of routing packets from a server (a source end-point device, in general) 207 to a PC (destination end-point device, in general) 209.

There may be a plurality of external vendor's server clusters, such as server clusters 251, 261 and 271, which are communicatively coupled with the intermediate network nodes, having external virus templates 253, 263 and 273 and external Service Modules (SMs) 255, 265 and 275. Further, the intermediate nodes 221, 222 and 223 may allow storage space for external vendor's virus templates and SMs, such as the templates and SMs 231, 232 and 233. These templates and SMs 231, 232 and 233 cut down the time required for processing a packet, and may be frequently updated by respective vendors. Effectively, the intermediate nodes 221, 222 and 223 frequently upgrade their virus detection capabilities automatically or manually, with or without assistance from external vendor's server clusters 251, 261 and 271.

The above said virus detection and processing functionality involves comparing the incoming packet payloads with virus templates available at the nodes and applying appropriate service modules (service module processing) indicated in the logic of the templates. If programmed to do so, service module processing involves, upon detection of a virus, sending messages to one or both of the respective end-point devices 207 and 209 to communicate either that a virus was detected or that a virus is possible or likely but not verified. The message may also require a human challenge mechanism to prevent a virus from deleting the message to remain hidden from a user. Examples of such human challenge messages appear in boxes 211 and 213, and may be accompanied by further information such as the sender's and receiver's IP addresses, sender email and other contact information, virus type, details, removal techniques, removal executable code, or links (e.g., hypertext) to removal sites or downloads.

As illustrated, the message may be a pop up message that appears on the monitors of the personal computer 209 and/or the server 207. To remove the pop up message, a human challenge requires entry of a number or identification of an image that is difficult for virus software to recognize. Other challenges such as finger printing or other biometric challenges or password entry are also contemplated. In situations where a virus is present, if the virus can be neutralized, a user after passing a human challenge may continue the packet download. Likewise, if no virus has been confirmed but screening indicates that one is possible, confirmation may continue the packet delivery. This procedure allows transmission of packets that are not necessarily virus, but may have similar file names or content. However, if the intermediate network nodes 221, 222 and 223 are certain that the packets contain virus codes they may block transmission of such packets and send appropriate messages to server and personal computer. Such virus containing packets may be dropped, and the intermediate nodes 221, 222 and 223 may store the sender's IP address for a longer time and take measures in case of repeated attempts to transmit virus, such as quarantining.

Detection of actual viruses, likelihood of viruses, and possibility of viruses (i.e., together virus characteristics) may involve matching (in whole or in part), for example: 1) a notorious source IP address; 2) virus code (including executable code or code representing text or data such as a file name); and 3) particular file or download types. To neutralize a virus, packets may be replaced in their entirety or only those portions that are harmful. Neutralizing may be beneficial where the underlying data or information is still needed by the user at the destination.

Figure 3:
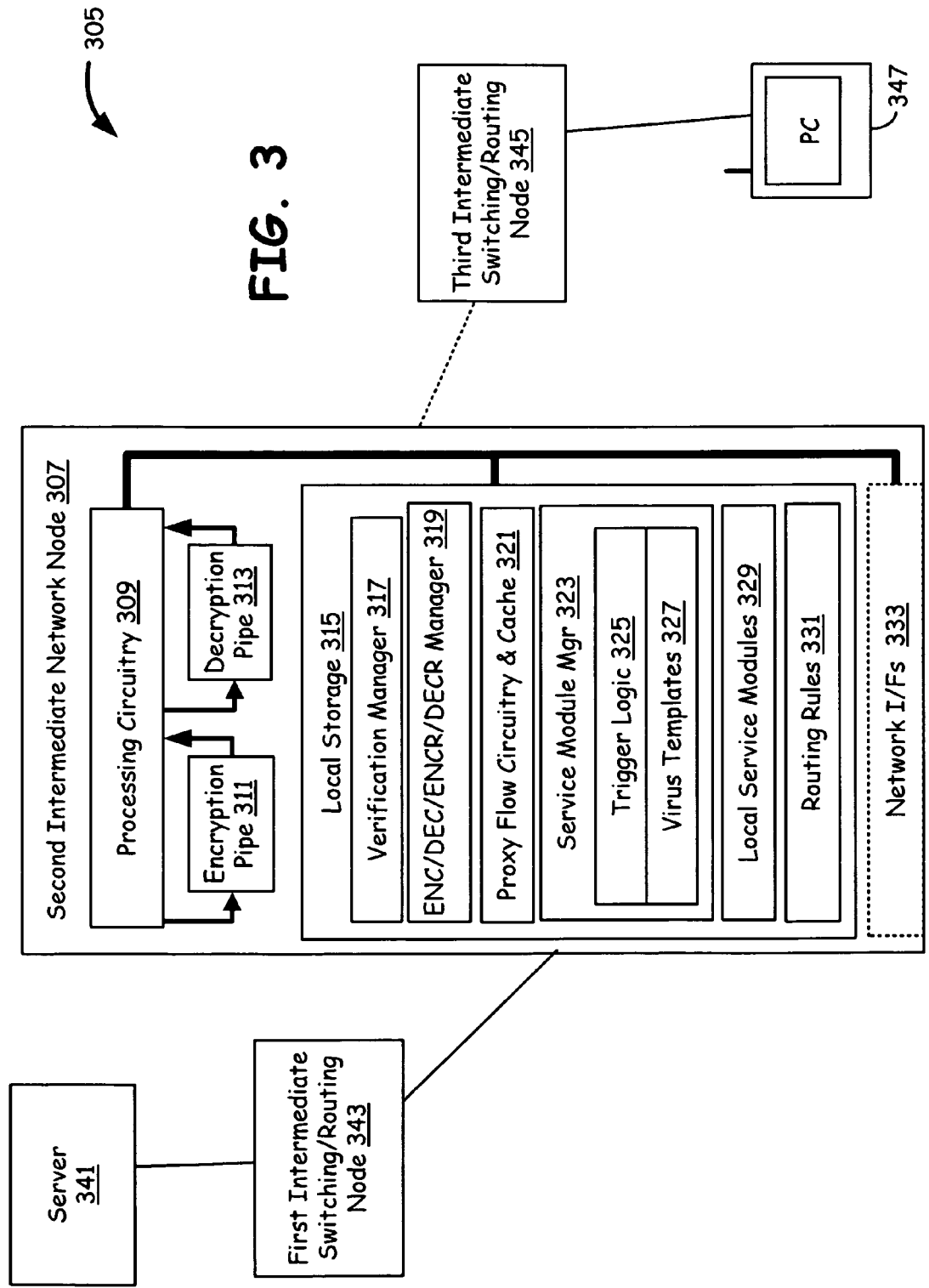
FIG. 3 is another schematic block diagram illustrating a portion of communication infrastructure of FIG. 2, where one of the intermediate network nodes is illustrated with detailed functional blocks, according to the present invention.

FIG. 3 is another schematic block diagram 305 illustrating a portion of communication infrastructure of FIG. 2, where one of the intermediate network nodes is illustrated with detailed functional blocks, according to the present invention. A source end-point device, a server 341 sends a packet, which may be encrypted and may contain virus, toward a destination end-point device, a personal computer 347 via intermediate network nodes 343, 307 and 345. In other embodiments, the source end-point device 341 or the destination end-point device 347 may be a server, personal computer, notebook computer, handheld computer, phone, or any other user equipment that sends or receives packets or files, via the network in consideration. The network nodes 343, 307 and 345 may be packet switching exchanges (PSE), routers/switches, access points (AP) or Internet service provider's equipments.

The illustrated intermediate network node 307 consists of a processing circuitry 309, communicatively coupled to it are encryption pipe 311 and decryption pipe 313. The encryption pipe 311 and decryption pipe 313 may be hardwired for speeding up the encryption and decryption of the received packets. Further, the intermediate network node 307 consists of a local storage 315 and a plurality of network interfaces 333. The local storage 315 further consists of verification manager 317 that ensures payload content analysis and application of service modules, for virus detection and processing, is performed by just one intermediate network node in the digital communication infrastructure 305, such as the node 307, which participates in the routing of packets. The local storage 315 also contains other functional blocks that are necessary to carry out header and payload analysis and application service functionalities on packets such as encryption/decryption and/or encoding/decoding (ENC/DEC/ENCR/DECR) manager 319, service module manager 323, trigger logic 325, virus templates 327 and local service modules 329. The proxy flow circuitry and cache 321 allows the network node 307 to store virus packets temporarily and analyze the packet payloads for any virus signature. Further, the proxy flow circuitry and cache 321 may store the IP addresses of senders of virus files. The routing rules 331 help route the packets toward destination end-point device.

The intermediate network node 307 allows storage space for external vendor's virus templates and SMs, to be stored with virus templates 327 and local service modules 329. These templates and SMs cut down the time required for processing a packet. The network node 307 allows respective external vendors to update these templates and SMs frequently. In effect, the intermediate node 307 frequently upgrades its virus detection capabilities, with or without assistance from external vendors. However, the capabilities of different nodes in any communication pathway between source and destination end-point devices need not be the same, and the verification manager 317 ensures that the virus detection and processing is applied non-repetitively.

In one embodiment of the present invention, when a hit for virus occurs in the network node 307, the trigger logic 325 directs the packet to one or more local service modules 329. The local service modules 329 may contain both external vendor's service modules and the locally installed service modules. If service modules are not available locally, remote or external service modules may be employed such as the service modules of external vendor's server clusters, described with reference to the FIG. 2.

The service modules may indicate the packets not to be routed to the destination end-point device, and may further indicate the proxy flow circuitry 321 to store the packet as well as the IP address of the sender for future considerations. If any more packets arrive from the same IP address (the source end-point device 341, for example), then the proxy flow circuitry 321 may reassemble the stored packets and vector the reassembled file to the service module manager 323 for analysis. Further, if this analysis confirms that the assembled file contains virus, then a predetermined action is taken. Any such repeated attempts to send virus files may cause the source end-point device 341 to be quarantined.

The virus detection itself may involve identifying a virus file name or a virus bit sequence. Alternatively, the virus detection may involve analyzing pieces of codes, that is, the codes intended for certain kind of operation. For example, some viruses may affect the registry of the personal computer 347. However, often just by analyzing one or few packets, the network node may not be able to confirm that a virus file is being transmitted. In such cases, the service module processing may involve sending messages with a human challenge to the source and destination end-point devices 341 and 347. The message may appear as a pop up message on the monitor, with a request for a response from a human user (human challenge).

The message may include a title such as "Virus Warning!", and a brief description of the type of the virus, sender's and receiver's IP address, type of virus, risk factor and some other details. Further, the message may give a brief description of the situation encountered by the node 307, such as during caching of the packets—"We are processing the file, please wait . . . " or during detection of a virus packet—"Sorry, virus files can not be transmitted . . . " or "The file being sent may contain a virus sequence . . . " Further, the message may include information relating to the risk factor and actions of the virus, such as "This virus <<Virus name and Code Number>> is of HIGH RISK FACTOR, affects your PC registry, and may disable <<one or more application related activities>>." Alternatively, the message may say, "This virus <<Virus name and Code Number>> is of LOW RISK FACTOR, reproduces in your PC, and sends itself to other PCs." The messages may be layered, with additional information about how the virus may damage the computer.

The human challenge may include few digits or alphabets with orientations unlike alphanumeric displays of the computer, and a human user should key in these alphanumeric characters and give approval for transmission of such packets. This procedure allows transmission of packets that are not necessarily virus, but may have similar file names or content. However, if the intermediate network node 307 determines with certainty that the packets contain virus codes, then, it may block such transmission and send appropriate messages to the server and personal computer, as described above.

The verification manager 317 verifies comparison table version code to ensure that the virus detection is not repeated. The comparison table version code incorporates information about virus templates that are compared on the packet and the service functionality used on the packet by a previous node. Information contained in the comparison table version code may include the virus template version, trigger logic version, local service module version, and the service modules applied locally or remotely. If any of the nodes in the communication path contains an enhanced or a recent version of virus templates, for example, the node may determine the needs of comparison with only those enhanced virus templates. Similar considerations apply to trigger logic and local service modules. Each node inserts such codes after processing the packet, thus informing rest of the nodes that participate the routing of the packet not to repeat the completed processes. On the contrary, if the comparison table version code does exist, then the verification manager 317 determines that no previous analysis has taken place on this packet.

If the packets that arrive at the network node 307 are encrypted and if further analysis for virus is indicated, as determined by the verification manager 317, then, the encryption/decryption manager 319 proceeds with decryption of the packet. The encryption/decryption manager 319 requests for the corresponding private key from the personal computer 347. This private key may be received in a secured manner through yet another public key cryptography session or in any other secured manner.

The service module manager (SMM) 323 analyzes the packet and applies one or more of service module (SM) processing. The SMM 323 contains various virus templates 327 such as header trigger templates and payload trigger templates, and further contains trigger logic 325. In general, the virus templates 327 may vary depending on the form of the packet. During the analysis of the packets, the SMM 323 compares the packet contents with the virus templates and if a full or partial match occurs, executes the trigger logic associated with the match. The virus templates 327 may contain typical virus file names or virus bit sequences. Then, the SMM 323 applies one or more SM processing as indicated in the trigger logic. Choice of a particular SM processing for a given packet depends on the trigger logic and indications in the template may include one of the above-mentioned processes.

The virus templates 323 may also contain spatially related trigger templates. The spatially related payload templates are payload trigger templates that are segmented into two or more trigger templates. One group of spatially related payload templates may consist of a plurality of bit sequences, such that the bit sequences from one related template to the next are sequential. For example, a group of spatially related payload template may consist of sequences of bits from a target virus code segmented into two or more contiguous bit sequences. That is, the first of the spatially related payload templates, in a group, may consist of 128 bits taken from the target data, and the second may consist of another sequence of 128 bits that is contiguous in the target data. By segmenting a large payload trigger template into smaller spatially related templates, the SMM 323 attempts to identify with near certainty. This is because the size of payload portion of the packet is not known beforehand, and a large payload trigger template when compared against a smaller payload portion of the packet, a trigger may not occur. Therefore, by comparing payload portion of the packet with a smaller first of the spatially related payload templates, a trigger may occur. When such a trigger occurs with the first template, the SMM 323 compares the payload portion of the sequence with second of the spatially related payload templates and so on. In other embodiments, the processing for virus may take many other sequence of operations.

Although in the above-mentioned embodiments, the descriptions and illustrations assume that the personal computer is downloading a file, in general the files may represent transmission of any packets such as web pages, software, or email with or without attachments. The file s may also represent any secured transmission of packets such as encrypted packets in a bank transaction. Similarly, with reference to FIGS. 1*a-c*, 2 and 3, the source and destination end-point devices are respectively shown as a server and a personal computer, but these end-point devices are not limited to servers and personal computers alone and may be any other type of devices including, but not limited to, two servers or two client devices. Likewise, the direction of flow between the end-point devices can be reversed or occur in both directions. Many variations are possible.

Figure 4:
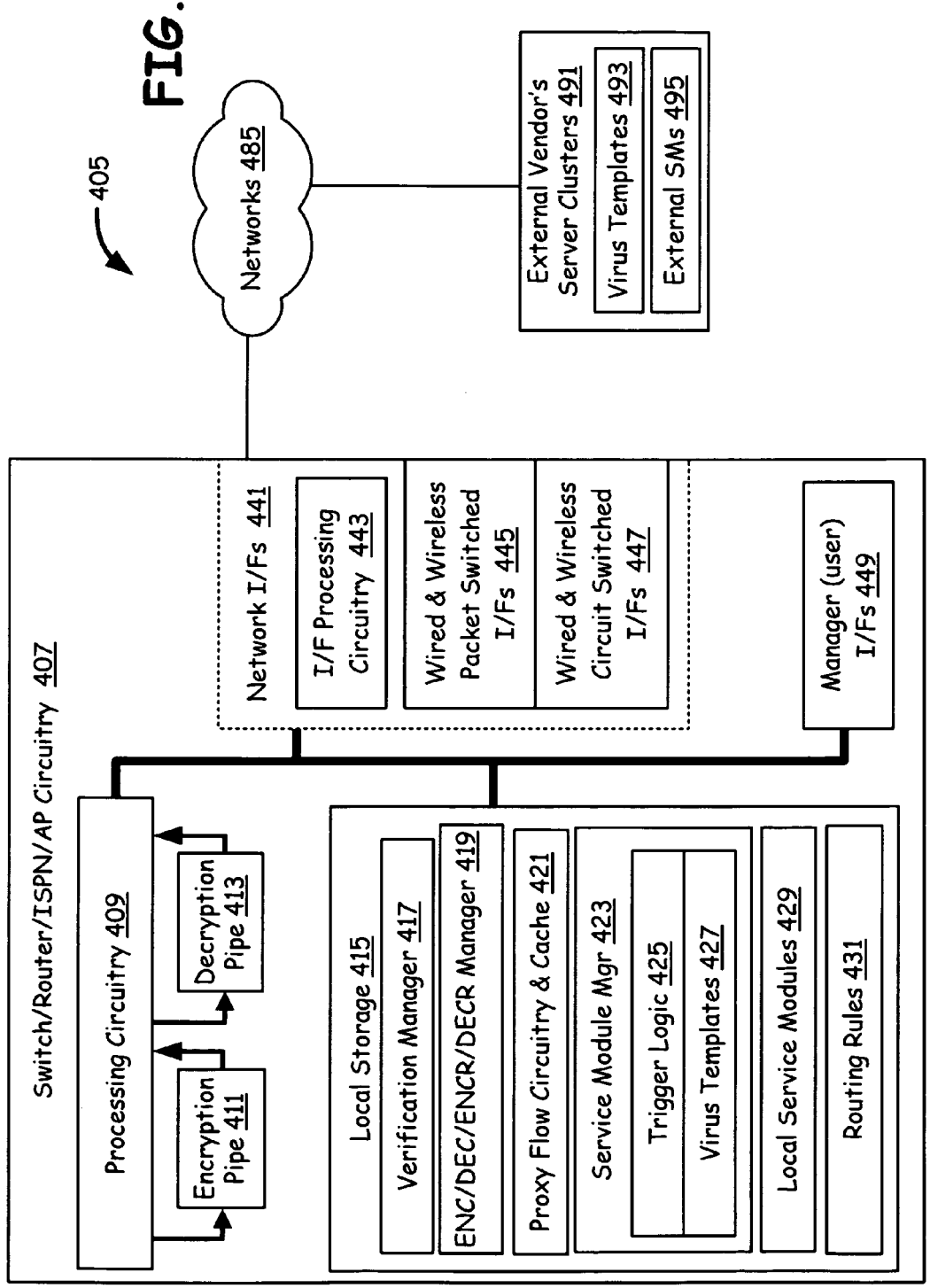
FIG. 4 is a schematic block diagram illustrating a network node (switch/router/ISPN/AP) constructed in accordance with the embodiments of FIGS. 1a-c and 2 of the present invention.

FIG. 4 is a schematic block diagram 405 illustrating a network node (switch/router/ISPN/AP) 407 constructed in accordance with the embodiments of FIGS. 1*a-c* and 2 of the present invention. The network node circuitry 407 may be any of the Internet node circuitry that routes data packets and the circuitry and may in part or full be incorporated in a network device such as a switch, router, and ISPN, or access point. The network node circuitry 407 generally includes processing circuitry 409, local storage 415, manager interfaces 449, and network interfaces 441. These components communicatively coupled to one another via one or more of a system bus, dedicated communication pathways, or other direct or indirect communication pathways. The processing circuitry 409 may be, in various embodiments, a microprocessor, a digital signal processor, a state machine, an application specific integrated circuit, a field programming gate array, or other processing circuitry. The processing circuitry 409 is communicatively coupled to an encryption pipe 411 and a decryption pipe 413. The encryption pipe 411 and decryption pipe 413 may be hardwired to increase the speed of encryption and decryption processes.

Local storage 415 may be random access memory, read-only memory, flash memory, a disk drive, an optical drive, or another type of memory that is operable to store computer instructions and data. The local storage 415 includes a verification manager 417 that ensures non-repetitive processing of packets by identifying whether analysis and service module processing has previously occurred and omitting steps that have already occurred by verifying a comparison table version code. Further, the local storage 415 includes encryption/decryption and/or encoding/decoding (ENC/DEC/ENCR/DECR) manager 419 that allows decryption and re-encryption of encrypted packets that arrive via the interfaces 441. The local storage 415 also contains proxy flow circuitry and cache 421 to store temporarily and process various packets containing virus and the corresponding IP addresses, and also to stores arriving packets of an encrypted file.

The local storage 415 further contains Service Module Manager (SMM) 423 that analyses incoming packets by comparing the header contents and payload contents with appropriate virus templates 427. Further, if any match is found during comparison, the trigger logic 425 directs the packets to appropriate local service modules 429 or remote service modules for application of service functionalities. The local storage 415 also contains routing rules 421, which regulate the flow of the packets.

Further, the network interfaces 441 contain wired and wireless packet switched interfaces 445, wired and wireless circuit switched interfaces 447 and further the network interfaces 441 may also contain built-in or an independent interface processing circuitry 443. The network interfaces 441 allow network devices to communicate with other network devices and allow processing circuitry 409 to receive and send packets, which may contain virus code sequences and/or be encrypted, and to obtain keys to decrypt the packets for analysis. Further, the network interfaces 441 allow utilization external service modules (SMs) for analysis and processing, when such SMs are not available in the local storage. The manager interfaces 449 may include a display and keypad interfaces. These manager interfaces 449 allow the user at the network exchanges to control aspects of the present invention such as characteristics of the verification manager 417, encryption/decryption manager 419 and service module manager 423.

In other embodiments, the network node 407 of the present invention may include fewer or more components than are illustrated as well as lesser or further functionality. In other words, the illustrated network device is meant merely to offer one example of possible functionality and construction in accordance with the present invention. Other possible embodiments of network nodes are described with reference to the FIGS. 5 and 7, in terms of PSE and AP respectively.

The network node 407 is communicatively coupled to external network devices, such as neighboring nodes (not shown) or external vendor's server clusters 491, via networks 485. The external vendor's server clusters 491 may also consist of elements of present invention such as virus templates 493 and external SMs 495. Further, the external vendor's server clusters 491 may have hardwired and software components of the present invention such as an encryption pipe, decryption pipe, encryption/decryption manager, verification manager and service module manager (not shown).

The verification manager 417 ensures that header, payload content analysis for virus contents and application of service modules are performed non-repetitively, by just one intermediate network node in the digital communication infrastructure, such as the node 407, which participates in the routing of packets. This is achieved by tagging the processed packets, which indicates the nodes about the process that are performed previously. The tagging is done by inserting a comparison table version code that incorporates information regarding trigger templates that is applied to the packet with the service functionality applied to the packet by previous nodes. The verification manager 417 searches each packet header on arrival of the packet, for a comparison table version code. If the comparison table version code does not exist in the packet, it means that no virus content processing has been done on the packet. On the contrary, if the comparison table version code does exist, then the verification manager 417 decodes the code to determine the packet header, payload analysis, and application of service functionalities that is performed before. By such information, the verification manager 417 is able to determine if any further virus detection and processing is indicated. If on the other hand, if further virus detection and processing is indicated, the packet is vectored to the encryption/decryption manager 419 or if not encrypted, directly to the SMM 423, for further analysis.

Figure 5:
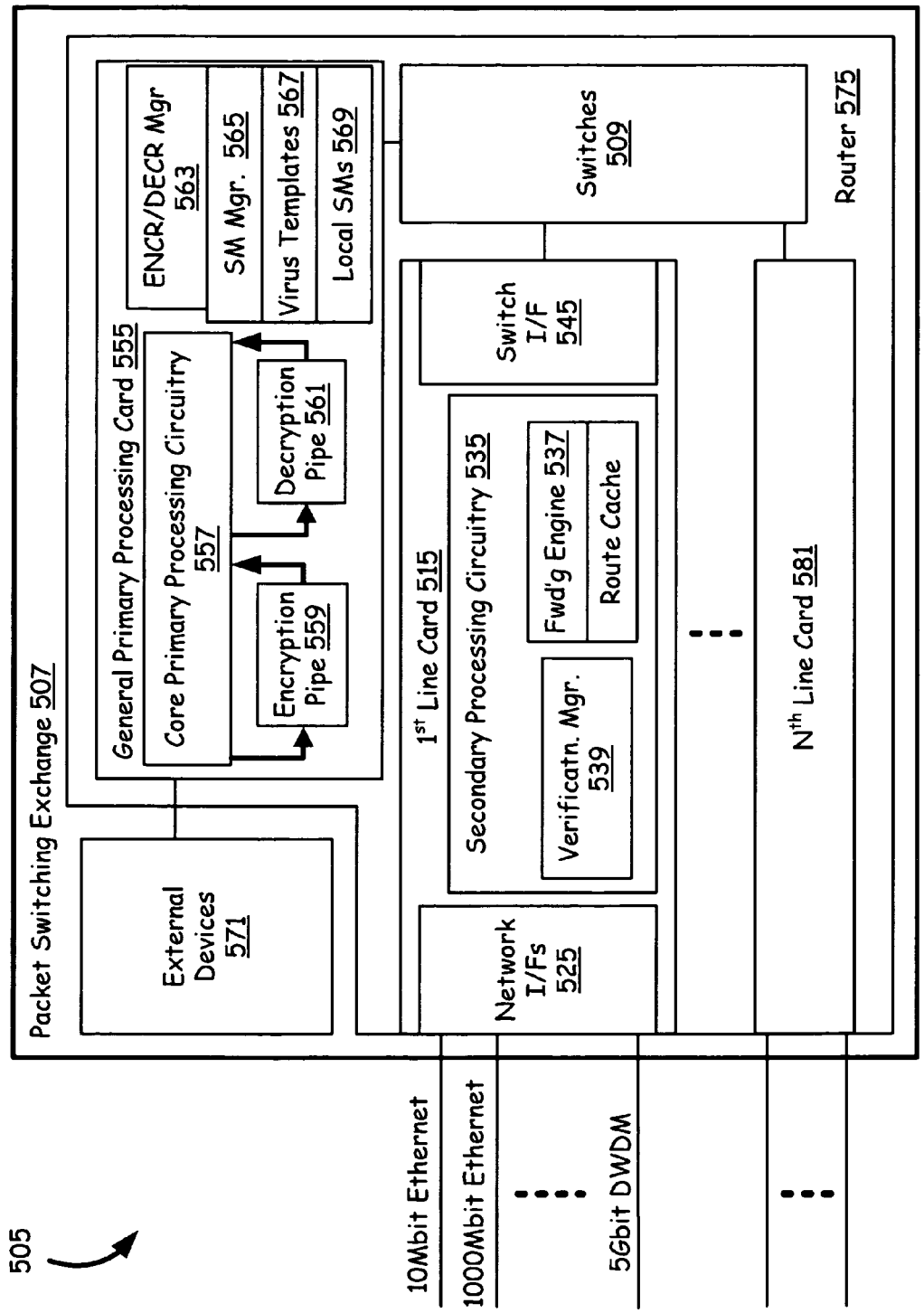
FIG. 5 is a schematic block diagram illustrating a packet switching exchange constructed in accordance with the embodiments of FIGS. 1a-c and 2 of the present invention.

FIG. 5 is a schematic block diagram 505 illustrating a packet switching exchange 507 constructed in accordance with the embodiments of FIGS. 1a-c and 2 of the present invention. For example, the Packet Switching Exchange (PSE) circuitry 507 may refer to any of the network nodes present in the Internet backbone 163 described with reference to the FIG. 1c or in the network 215 described with reference to the FIG. 2. The PSE circuitry 507 generally includes a router 575 comprising general primary processing card 555, switches 509, and plurality of line cards 515 and 581. Further, the PSE 507 may also contain external devices 571, such as storage units or user interfaces (not shown). The line cards 515 and 581 may all be different in certain cases.

The first line card 515 consists of network interfaces 525 capable of interfacing with wired and wireless networks such as 10 Mbit, 1000 Mbit Ethernet networks, and 5 Gbit DWDM (Dense Wavelength Division Multiplexing) fiber optic networks. The first line card 515 also contains switch interfaces 545 that allow the card to interface with interconnecting switches 509. Further, the first line card 515 consists of secondary processing circuitry 535, which preprocesses the packets before interconnecting switches 509 route the packets. The secondary processing circuitry 535 contains forwarding engine 537 and route cache. The secondary processing circuitry, in addition to preprocessing the packets, also contains verification manager 539, which verifies incoming packets for previous detection and processing of virus contents in arriving packets. This verification is done by decoding comparison table version code and interpreting the information for the processing done before. If all of the analysis and application of service functionalities that are available with the PSE 507 are already performed by one or more of the previous nodes, then the verification manager 539 allows the packets to be routed without any further delay.

The general primary processing card 555 further consists of core primary processing circuitry 557, which is communicatively coupled to an encryption pipe 559 and a decryption pipe 561. The encryption pipe 559 and decryption pipe 561 may be hardwired to increase the speed of encryption and decryption processes. The general primary processing card 555 also contains encryption/decryption manager 563 and, service module manager (SMM) 565, virus templates 567 and local service modules 569. The SMM 565 in conjunction with virus templates 567, local service modules 569, and remote service modules (not shown) perform analysis of packet payload and application of service functionalities, if the verification manager 539 indicates such analysis and application of SMs. The SMM 565 may insert comparison table version code in the header of the packets, if the PSE 507 performs packet payload analysis and applies service functionalities.

The SMM performs virus detection and processing functionality by comparing the incoming packet payloads with virus templates 567 and applying appropriate service modules (service module processing) 569 indicated in the logic of the templates. The service module processing involves, upon detection of a virus, sending messages with a human challenge to the respective end-point devices. The message may be a pop up message that appears on the monitors of the end-point devices, such as the personal computer 209 and/or server 207 described with reference to the FIG. 2. The message may include a title such as "Virus Warning!", and a brief description of the type of the virus, sender's and receiver's IP address, type of virus, risk factor and some other details. Further, the virus templates 567 and local SMs 569 may provide space for external vendor's virus templates and service modules.

Figure 6:
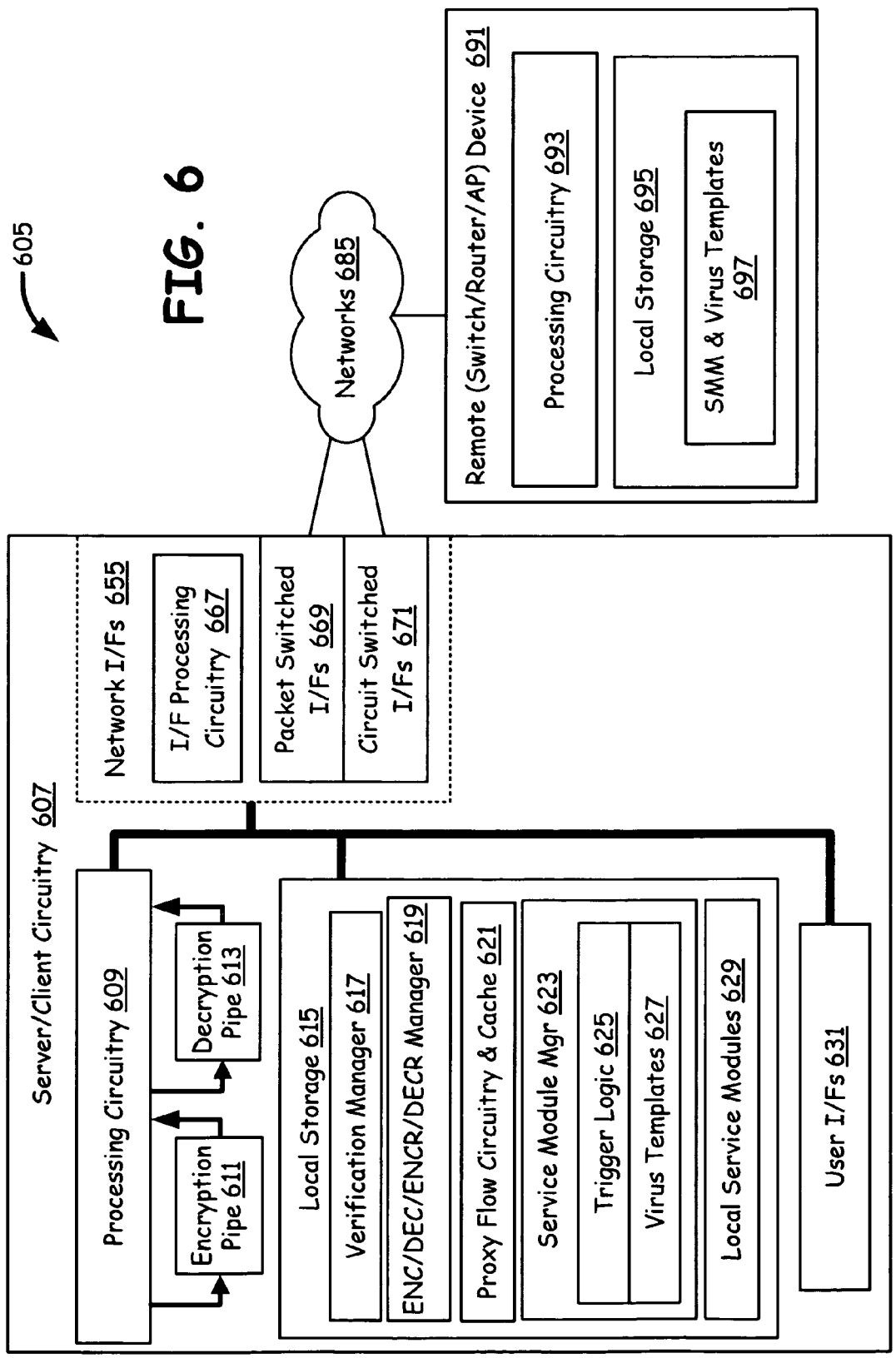
FIG. 6 is a schematic block diagram illustrating end-point devices (servers and/or clients) constructed in accordance with the embodiments of FIGS. 1a-c and 2 of the present invention.

FIG. 6 is a schematic block diagram 605 illustrating end-point devices (servers and/or clients) 607 constructed in accordance with the embodiments of FIGS. 1a-c and 2 of the present invention. The server/client circuitry 607 may refer to any of the device circuitry from which packets, encrypted or not and may contain portions of virus codes, originate and/or terminate, and the circuitry may in part or full be incorporated in any of the end-point devices described with reference to the FIGS. 1a-c and 2. The server/client circuitry 607 generally includes processing circuitry 609, local storage 615, user interfaces 631, and network interfaces 655. These components communicatively coupled to one another via one or more of a system bus, dedicated communication pathways, or other direct or indirect communication pathways. The processing circuitry 609 may be, in various embodiments, a microprocessor, a digital signal processor, a state machine, an application specific integrated circuit, a field programming gate array, or other processing circuitry. A hardwired encryption pipe 611 and a hardwired decryption pipe 613 are communicatively coupled to the processing circuitry 609, although in case of servers and clients such as personal computers, these components may be implemented through software.

The network interfaces 655 may contain wired and wireless packet switched interfaces 669, wired and wireless circuit switched interfaces 671 and the network interfaces 655 may also contain built-in or an independent interface processing circuitry 667. The network interfaces 655 allow end-point devices to communicate with other end-point devices. The user interfaces 631 may include a display and keypad interfaces.

Local storage 615 may be random access memory, read-only memory, flash memory, a disk drive, an optical drive, or another type of memory that is operable to store computer instructions and data. The local storage 615 includes verification manager 617 in a simplified form, which may assist in verifying the comparison table version code at the destination. Further, the local storage 615 may include a simplified version of encryption/decryption manager 619. Simplified versions of service module manager 623, trigger logic 625, virus templates 627 and local service modules 629 assist in pre-processing the packets (that is, virus detection and pre-processing functionalities) at the source end-point devices.

In other embodiments, the network device 607 of the present invention may include fewer or more components than are illustrated as well as lesser or further functionality, and may adapt to the data packets exchange functionality rather than voice packets exchange. In other words, the illustrated end-point device is meant merely to offer one example of possible functionality and construction in accordance with the present invention.

The end-point device 607 is communicatively coupled to external network devices, such as device 691, via networks 685. The external network device 691 may also consist of elements of present invention such as processing circuitry 693 and local storage 695 consisting, SMM and virus templates 697, verification manager (not shown) among other functional blocks of the present invention. The server or client devices typically communicate with each other, when security is essential, by sending and receiving encrypted packets. These packets are decrypted using keys at the end-point. When a network node, such as remote device 591, requests for a public or private key, for packet analysis, the encryption/decryption manager 619 verifies the authenticity of the remote device 691 by confirming the digital certificate sent by the device 691. Once confirmed, the encryption/decryption manager 619 sends the requested key using a secured session. However, this process may not be needed if the packets are not encrypted at the source end-point device. The end-point devices often behave as servers for viruses, by replicating them and sending them to other devices, which in part may be detected and processed by the respective end-point devices, by using the elements described in the illustration.

Figure 7:
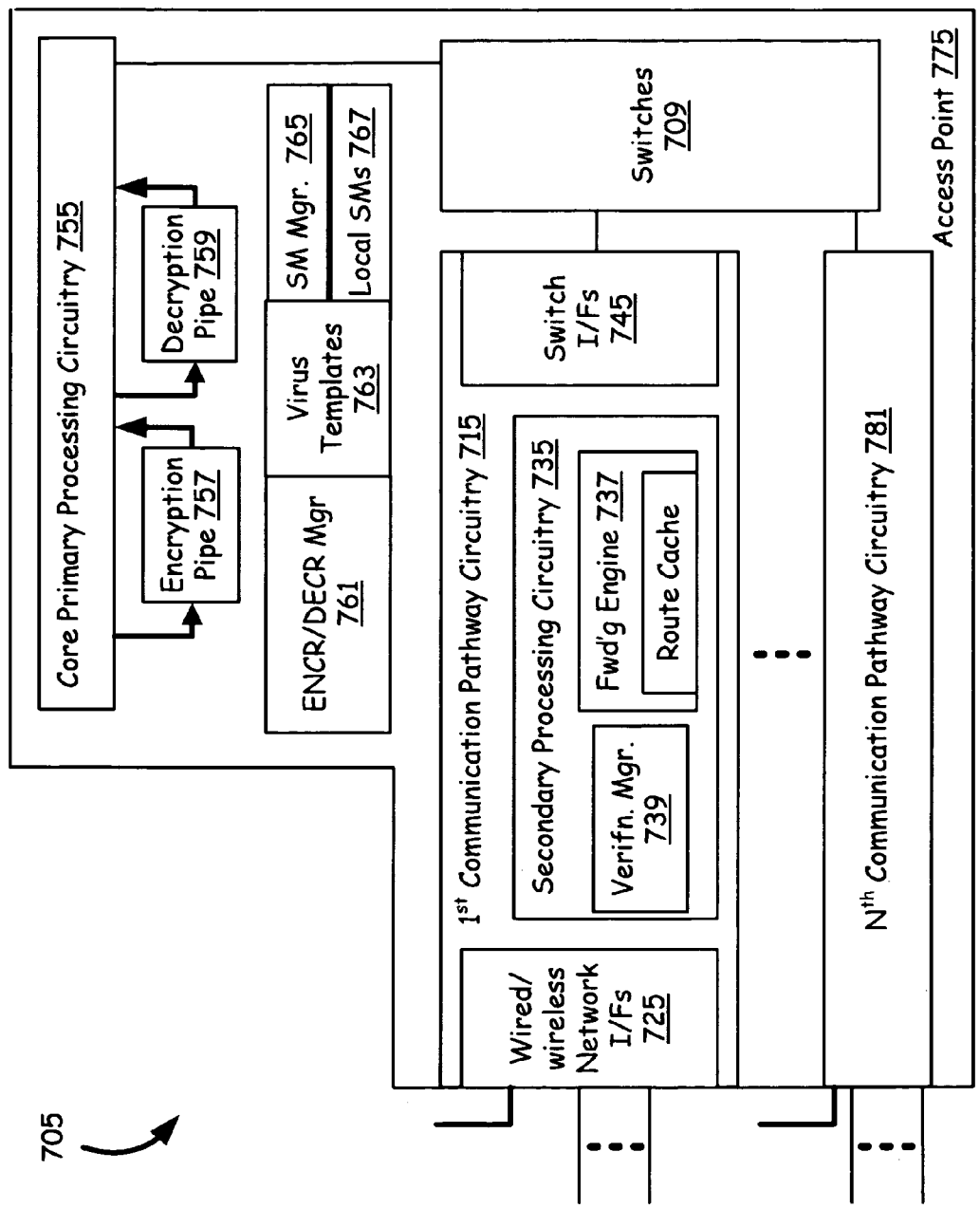
FIG. 7 is a schematic block diagram illustrating an access point constructed in accordance with the embodiments of FIGS. 1a-c and 2 of the present invention.

FIG. 7 is a schematic block diagram 705 illustrating an access point 775 constructed in accordance with the embodiments of FIGS. 1b-c and 2 of the present invention. The access point circuitry 775 may refer to circuitry within any of AP's described with reference to the FIGS. 1b-c, or any of the nodes in the network 215 in FIG. 2. The AP circuitry 775 generally includes a plurality of communication pathway circuitries 715, 781, core primary processing circuitry 755 and switches 709. The communication pathway circuitries 715 to 781 may all be different in certain cases. The first communication pathway circuitry 715 consists of wired and/or wireless network interfaces 725 capable of interfacing with wired and wireless networks, switch interfaces 745 that allow the card to interface with interconnecting switches 709 and secondary processing circuitry 735. The secondary processing circuitry 735 preprocesses the packets before interconnecting switches 709 route the packets.

The core primary processing circuitry 755 is communicatively coupled to encryption pipe 757 and decryption pipe 759, which may be hardwired to quickly encrypt and decrypt packets. Further, the access point circuitry 775 consists of encryption/decryption manager 761 and a registry of keys. The access point 775 also contains service module manager 765 and local service modules 767. The access point circuitry 775 functions in a way similar to that of packet switching exchange 507 described with reference to the FIG. 5, but may contain much-simplified components.

Figure 8:
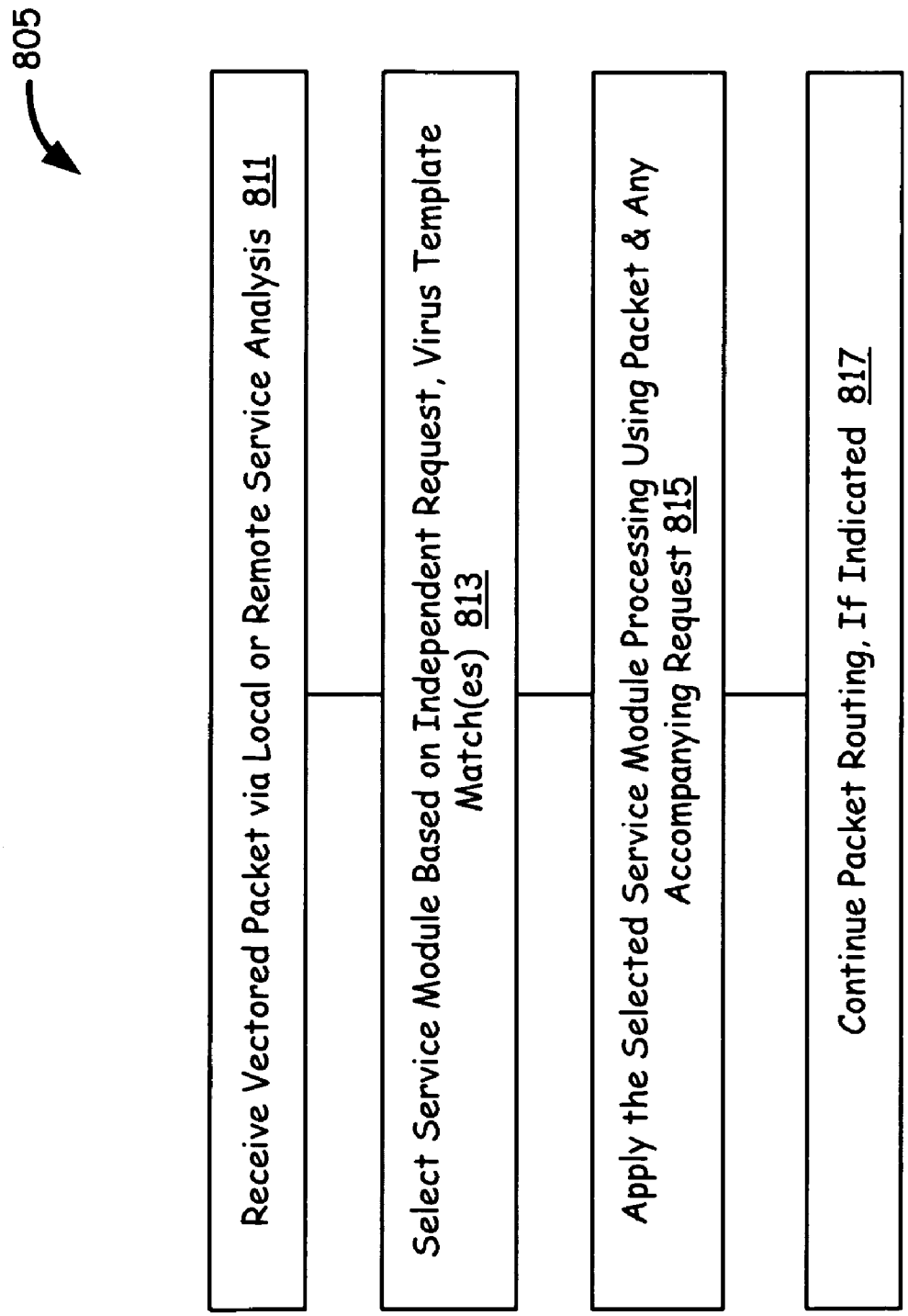
FIG. 8 is a flowchart illustrating general flow of functionality of network devices of FIGS. 3, 4, 5 and 7.

FIG. 8 is a flowchart 805 illustrating general flow of functionality of network devices of FIGS. 3, 4, 5 and 7. The functional flow begins at a block 811 with the network node receiving a vectored packet via local or remote service analysis. The received packet may be processed by previous nodes, may be encrypted or may contain segmented portions of an encrypted file, or may contain virus filenames or code sequences.

At a next block 813, the network node selects Service Modules (SMs) based on independent requests, virus template matches, and the trigger logic indications. If no matches are indicated, then the packets are not processed any further, that is, the SMs are not applied, and the packet is forwarded for further routing.

Then, at a next block 815, the network node applies selected SM processing using packet and any accompanying request. The virus processing using service modules may include sending messages to the respective end-point device, obtaining their approval for transmission of such packets or simply discarding the packets. Then, at a next block 817, the network node continues packet routing, if indicated.

Figure 9:
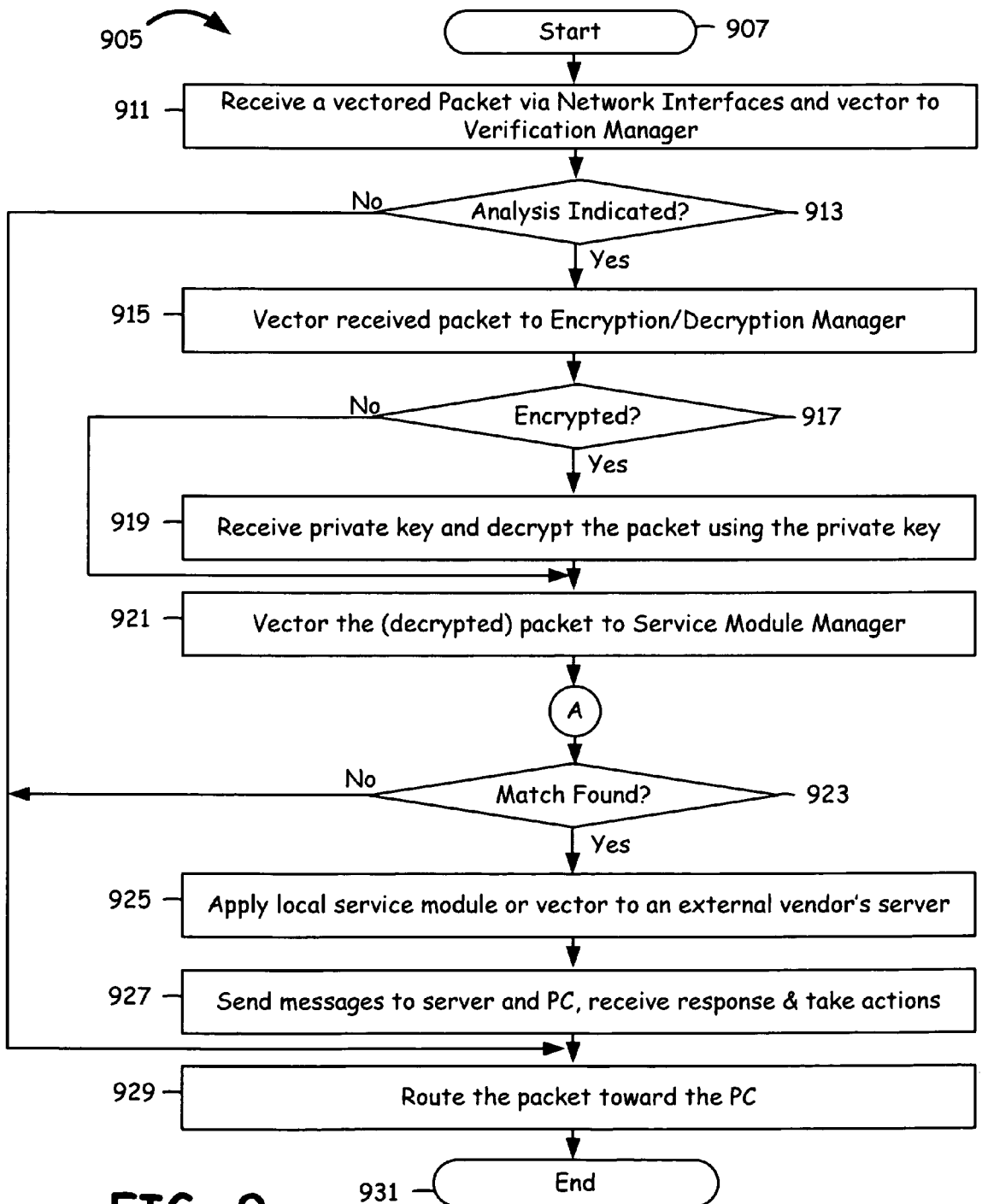
FIG. 9 is a flowchart illustrating functionality of network node of FIGS. 3, 4, 5 and 7, continuing from flowchart of FIG. 8.

FIG. 9 is a flowchart 905 illustrating detailed flow of functionality of network node of FIGS. 3, 4, 5 and 7. The functionality of network node begins at a start block 907. The overall functionality, for detection and processing of virus code sequences in a packet may include verifying for any previous analysis, decryption, detection of a virus code, service module applications, encryption, insertion of comparison table version code and further routing. At a next block 911, the network node receives a packet via network interfaces and vectors it to verification manager.

Then, at a next decision block 913, the verification manager in the network node determines if any further analysis is indicated. If no further analysis is indicated, that is, if all of the virus detection and processing capabilities of the network node in consideration is the same as that of a previous node, then the packet is routed toward the personal computer, at a block 929. The network node functionality ends at a next block 931.

Alternatively, if verification manager at the decision block 913 determines that further analysis is required, then the packet is vectored to encryption/decryption manager of the network node, at a next block 915. Then, at a next decision block 917, the encryption/decryption manager determines if the incoming packet is encrypted. If the packet is encrypted, at a next block 919, the encryption/decryption manager receives private key from the personal computer and decrypts the packet using the received private key. If, on the other hand, the packet payload contains a segment of an encrypted file, a proxy flow manager may cache the packet with other incoming packets, for further analysis, as described with reference to the flowchart of FIG. 11. If the packet is not encrypted, then the step of block 919 is skipped.

Then, at a next block 921, the packet is vectored to the service module manager. The functionality of the network node thereafter, that is, after a next block A, is described in detail with reference to the flowchart of FIG. 10. Then, at a next decision block 923, the network node determines if a match is found during comparison of packet payload with virus templates. If no matches are found, then the packet is routed toward the personal computer, at the block 929. The network node functionality ends at the next block 931.

Alternatively, if a match is found, then local service modules are applied, at a next block 925. The local service modules may also contain external vendors' service modules. If local service modules are not available, then the packet is vectored to an external vendor's server. Then, at a next block 927, the network node sends messages to the server and the personal computer and receives response from either or both of the end-point devices (that is, the server and personal computer). Then, appropriate actions are taken on the packet. At a next block 929, the packet is routed toward the PC, if indicated and the network node functionality ends at the next block 931.

Figure 10:
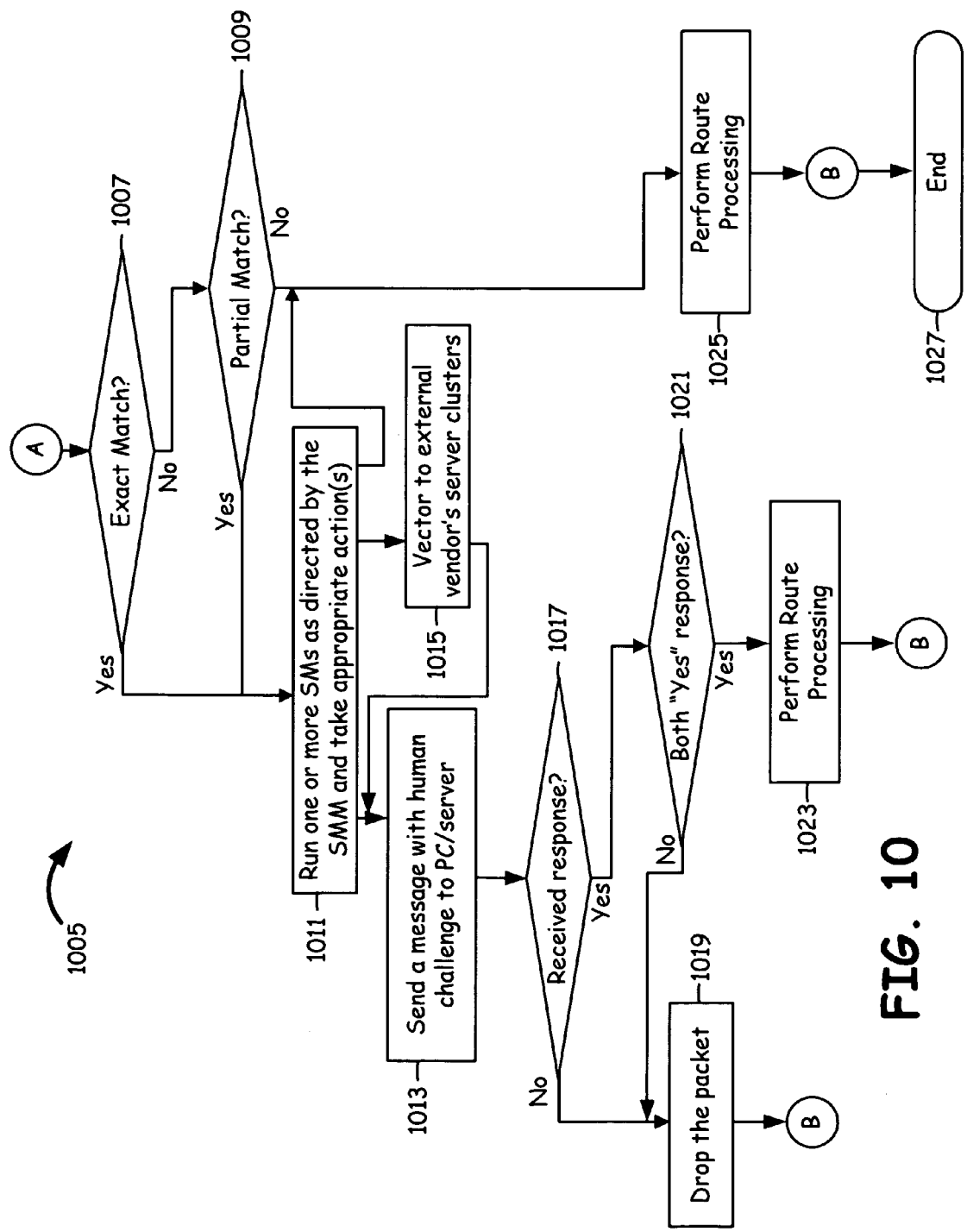
FIG. 10 is a flowchart illustrating detailed flow of functionality of service module manager aspect of FIG. 9, in network node of FIGS. 3, 4, 5 and 7.

FIG. 10 is a flowchart 1005 illustrating functionality of network node of FIGS. 3, 4, 5 and 7, continuing from flowchart of FIG. 9. The functionality for detection and processing of virus code sequences in a packet that includes verifying for any previous analysis, decryption, and vectoring to the service module manager, that is, up to the block A, is described with reference to the flowchart of FIG. 9. Then, at a decision block 1007, the network node determines if exact match is found in comparison with any of the virus templates. If no exact matches are found, then at a next decision block 1009, the network node determines if any partial matches are found. If partial matches are not found as well, then at a next block 1025, the network node performs route processing and the functionality ends at a next end block 1027.

If either exact or partial matches are found at decision blocks 1007 or 1009, then at a next block 1011, the service module manager of the network node runs one or more SMs and thus takes one or more actions on the packet. One of the actions taken on the packet is to perform route processing at the block 1025, without doing anything. This may be the case, for example, when the application of service module determines that the packet content, with a partial match, may not contain any virus codes or file names. Another action that might be performed is to vector the packet to external vendor's service clusters, at a next block 1015. The external vendor's servers may perform virus detection and processing on the packet and send it back to the network node.

Another of the actions taken is to send a message to both the personal computer and server, with a human challenge and request for a response from both end-point devices, at a next block 1013. At a next decision block 1017, the network node verifies if the responses from both end-point devices are received. If no response is received from either or both of the end-point devices, then, at a next block 1019, the network node drops the packets. After that, the network node verifies if both "Yes" responses are received from the end-point deices, at a next decision block 1021. If both of the responses received are "Yes," then the network node performs route processing at a next block 1023 and the functionality of the network node ends at the block 1027. If either of the end-point devices sends a response of "No," then the network node drops the packets at the next block 1019. Alternatively, the external vendor's servers may also perform the steps of blocks 1013, 1017, 1019, 1021 and vector the packet to the network node to perform routing.

Figure 11:
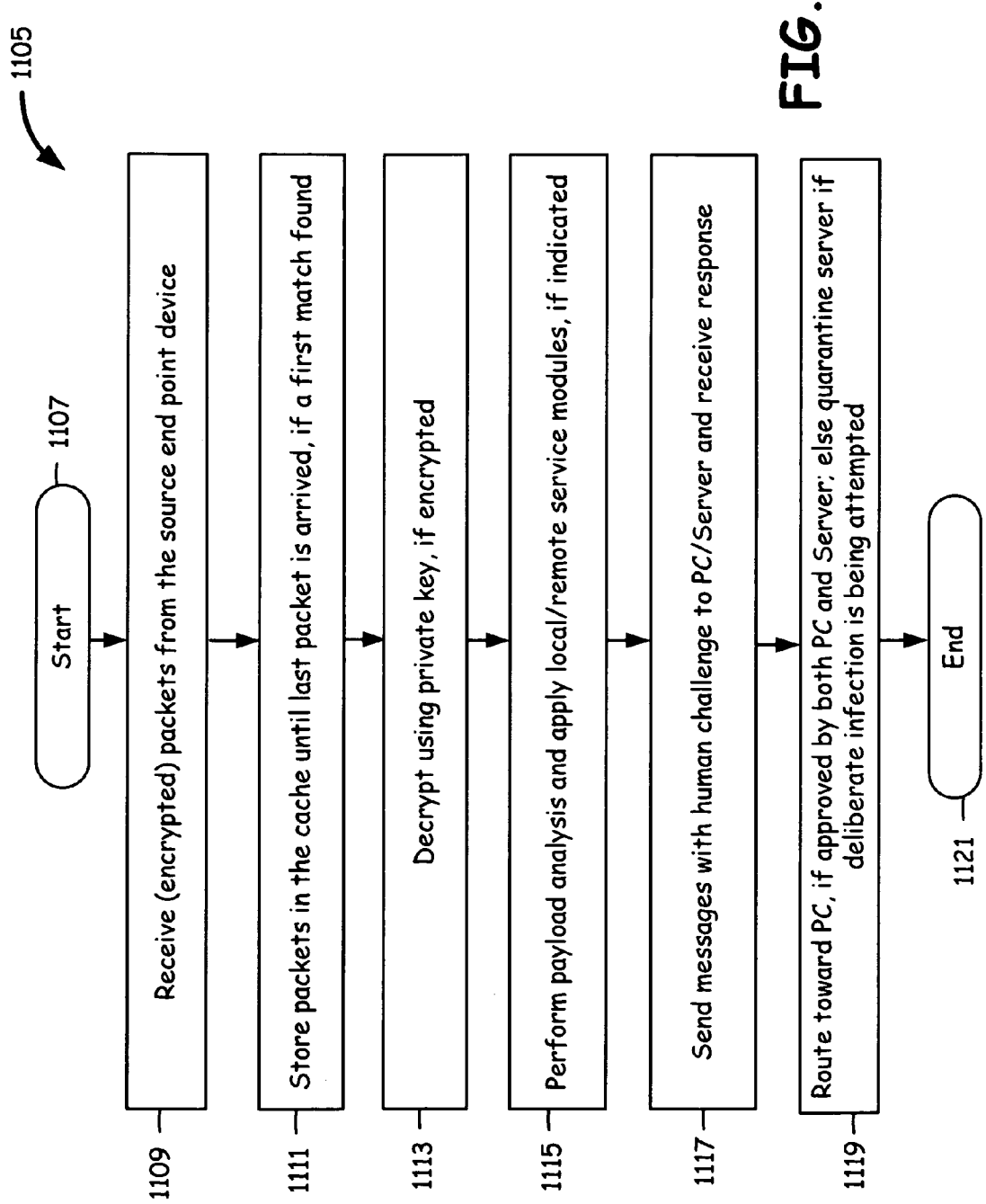
FIG. 11 is a flowchart illustrating general flow of functionality of network node of FIGS. 3, 4, 5 and 7, wherein the network node caches the packets containing virus contents, identifies perpetrating end-point devices, and responds appropriately.

FIG. 11 is a flowchart 1105 illustrating general flow of functionality of network node of FIGS. 3, 4, 5 and 7, wherein the network node caches the packets containing virus contents, identifies perpetrating end-point devices and takes appropriate measures. In this embodiment of the present invention, the network node employs a proxy flow circuitry and cache to store and keep track of packets with virus contents as well as the IP addresses of the sending end-point devices. The functionality of the network node begins at a start block 1107. At a next block 1109, the network node receives packets, which may be encrypted, from the source end-point device or from a neighboring network device.

At a next block 1111, the network node stores all of the arriving packets that are from an encrypted file, until there is enough portion of the file to perform analysis. At a next block 1113, the network node decrypts the packet if encrypted. Then, at a next block 1115, the network node performs payload analysis and applies local service modules or vectors the packet to another device for application of external service modules.

Then, at a next block 1117, the network node sends messages with human challenge to both personal computer and server and receives response, if virus codes are found. At a next block 1119, the network node routes the packet toward the personal computer, if approved by both the personal computer and the server. Otherwise, the network node may quarantine the server, if repeated deliberate attempts to infect viruses are found. Alternative to the embodiment mentioned above, the proxy flow circuitry might also store the packets that contain virus codes, after the analysis, and then apply the service modules or follow some of the above-mentioned steps. The functionality ends at a next end block 1121.

As one of average skill in the art will appreciate, the term "communicatively coupled," as may be used herein, includes wireless and wired, direct coupling and indirect coupling via another component, element, circuit, or module. As one of average skill in the art will also appreciate, inferred coupling (i.e., where one element is coupled to another element by inference) includes wireless and wired, direct and indirect coupling between two elements in the same manner as "communicatively coupled."

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. A communication infrastructure that provides packet switched communication pathways for exchanging packets, the communication infrastructure comprising:
   a source end-point device;
   a destination end-point device having a destination address;
   a backbone network comprising a plurality of switching devices arranged to form at least one pathway from the source device to the destination device, at least one of the plurality of switching devices including a virus template different from a virus template included in another of the plurality of switching devices, wherein the plurality of switching devices operate to minimize duplicate virus detection efforts by cooperating to select a selected switching device of the plurality of switching devices to compare a packet potentially containing a virus, with a virus template included in the selected switching device;

the source device delivers a packet comprising the destination address and a virus characteristic to the selected switching device in the at least one pathway to perform the comparison;

the selected switching device detects the virus characteristic after receiving the packet by comparing the packet with the virus template, and triggers a virus service function; and the selected switching device interrupts the delivery of the packet toward the destination via the destination address.

2. The communication infrastructure of claim 1, wherein the selected switching device detects the virus characteristic by comparing the packet with a plurality of virus templates.

3. The communication infrastructure of claim 2, wherein the virus service function is selected from a plurality of virus service modules, and each of the plurality of virus service modules corresponds to at least one of the plurality of virus templates.

4. The communication infrastructure of claim 2, wherein a first of the plurality of virus templates is compared to packet payload.

5. The communication infrastructure of claim 3, wherein a first of the plurality of virus templates is compared to supplemental packet information.

6. The communication infrastructure of claim 1, wherein the virus service function includes sending a message regarding the detection.

7. The communication infrastructure of claim 6, wherein the message includes a challenge mechanism for a user.

8. The communication infrastructure of claim 2, wherein the selected switching device performs decryption before the comparison.

9. The communication infrastructure of claim 1, further comprising a server that is communicatively coupled to the selected switching device, and the virus service function is performed at least in part on the server.

10. The communication infrastructure of claim 1, wherein the virus service function comprising disabling the virus by changing content of the packet.

11. The communication infrastructure of claim 1, wherein the detection of the virus characteristic confirms that a virus is present at least in part within the packet.

12. The communication infrastructure of claim 1, wherein the detection of the virus characteristic indicates that a virus may be present at least in part within the packet.

13. Intermediate network node circuitry in a communication infrastructure that provides a packet switched communication pathway for exchanging packets between a first end-point device and a second end-point device, the second end-point device having a network address, the intermediate network node circuitry comprising:

first interface circuitry that receives a packet originating from the first end-point device, the first packet comprising the network address of the second end-point device and a virus characteristic;

second interface circuitry associated with the network address of the second end-point device;

switching circuitry that selectively provides a pathway between the first interface circuitry and the second interface circuitry;

processing circuitry that compares at least one template to the packet to detect the virus characteristic, the at least one template differing from at least one template of another intermediate network node circuitry also performing virus detection to cooperate with other intermediate network node circuitry in an attempt to minimize duplicate virus detection efforts; and the processing circuitry, upon detecting the virus characteristic, triggers a virus service function, wherein the virus service function comprising changing content of the packet to add an indication within the packet that the packet has been evaluated.

14. The intermediate network node circuitry of claim 13, wherein the virus service function includes sending a message regarding the detection.

15. The intermediate network node circuitry of claim 14, wherein the message includes a challenge mechanism for a user.

16. The intermediate network node circuitry of claim 13, wherein the processing circuitry performs decryption before the comparison.

17. The intermediate network node circuitry of claim 13, wherein the processing circuitry triggers the virus service function by executing locally stored program code.

18. The intermediate network node circuitry of claim 13, wherein the processing circuitry triggers at least a portion of the virus service function via an external system.

19. The intermediate network node circuitry of claim 13, wherein the detection of the virus characteristic confirms that a virus is present at least in part within the packet.

20. The intermediate network node circuitry of claim 13, wherein the detection of the virus characteristic indicates that a virus may be present at least in part within the packet.

21. The intermediate network node circuitry of claim 13, wherein the intermediate network node circuitry is placed within an access point device.

22. The intermediate network node circuitry of claim 13, wherein the intermediate network node circuitry is placed within an Internet backbone node.

23. A method performed by an intermediate network node in a packet switched communication pathway supporting a source end-point device, the method comprising:

receiving, at a first intermediate network node, a first packet originating from the source end-point device;

comparing the first packet with a plurality of virus templates, respective ones of the plurality of virus templates being associated with different ones of a plurality of virus service functions, wherein the virus service functions target different virus families, and at least some of the virus service functions are included in other intermediate network nodes;

transmitting the first packet upon failing to match the first packet with any of the plurality of virus templates;

receiving a second packet having a virus characteristic, the second packet originating from the source end-point device;

comparing the second packet with the plurality of virus templates;

selecting one of the other intermediate network nodes based on a result of the comparing; and transmitting the packet to the one of the other intermediate network nodes to compare the second packet to at least another of the plurality of virus templates upon successfully matching the second packet with at least one of the plurality of virus templates, the one of the other intermediate network nodes implementing a selected one of the plurality of virus service functions.

24. The method of claim 23, further comprising periodically updating the plurality of virus templates.

25. The method of claim 23, further comprising sending a message regarding the successful matching.

26. The method of claim 25, wherein the message includes a human challenge.

27. The method of claim 23, wherein at least a portion of the selected one of the plurality of virus service functions is local to the intermediate network node.

* * * * *